Dec. 5, 1967  L. E. ROBERTS  3,356,980

TEMPERATURE-SENSING DEVICE

Filed Jan. 5, 1965  4 Sheets-Sheet 1

INVENTOR.
LINCOLN EDWIN ROBERTS
BY

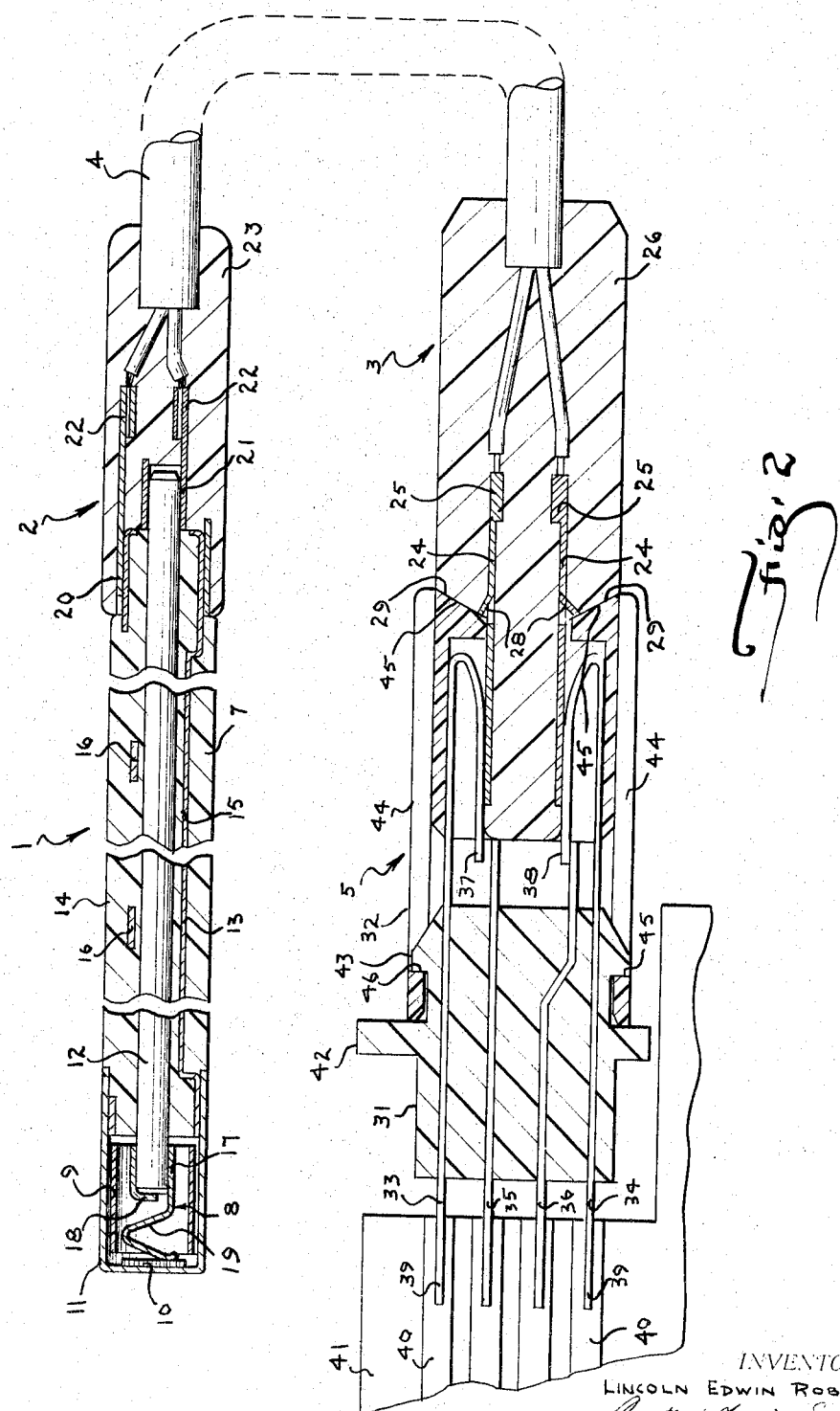

Dec. 5, 1967     L. E. ROBERTS     3,356,980
TEMPERATURE-SENSING DEVICE
Filed Jan. 5, 1965     4 Sheets-Sheet 3
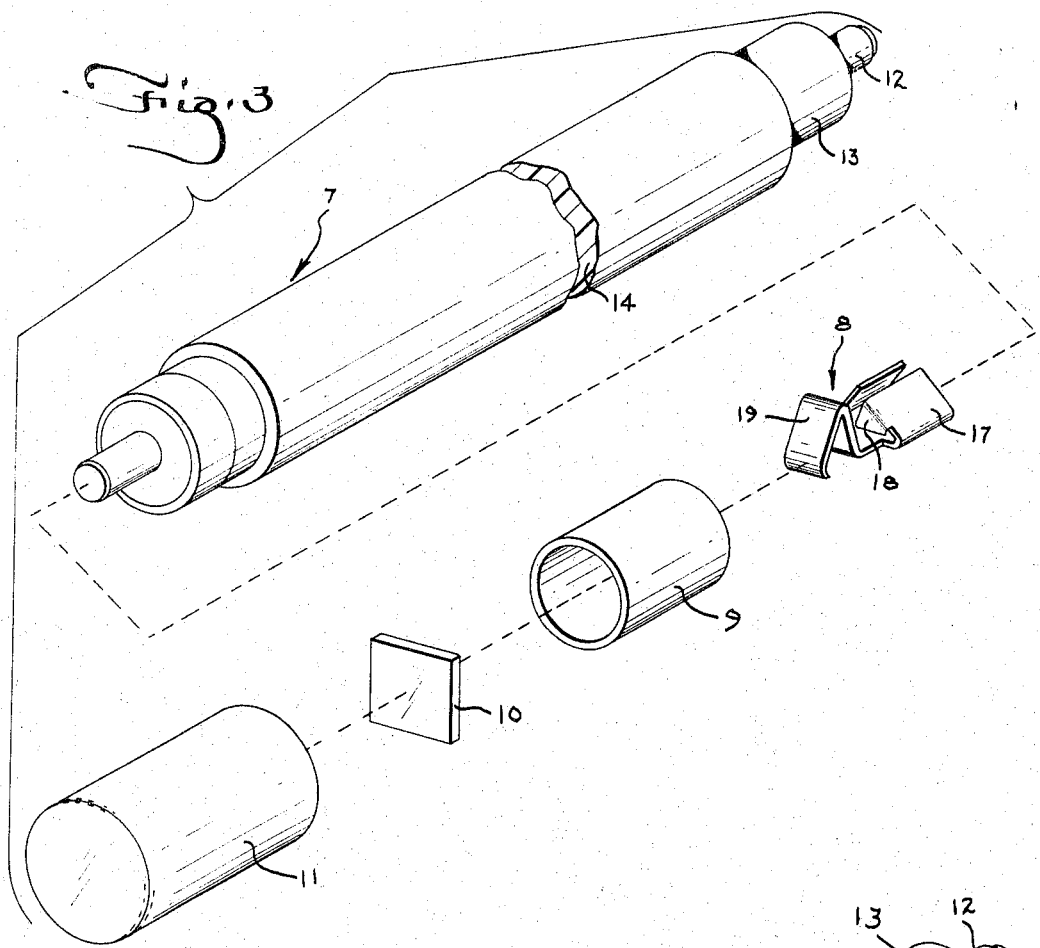
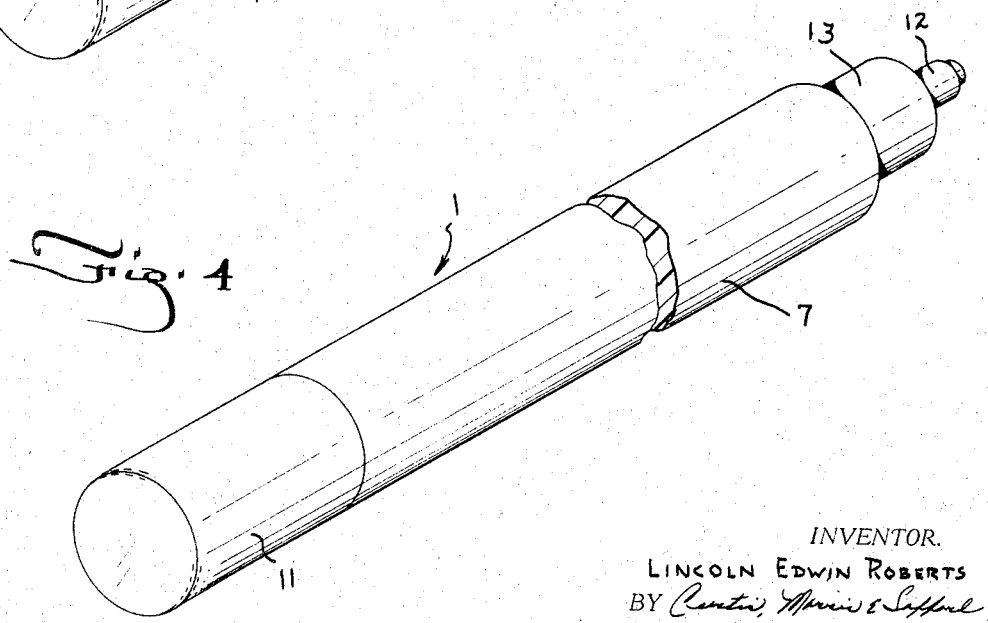
INVENTOR.
LINCOLN EDWIN ROBERTS

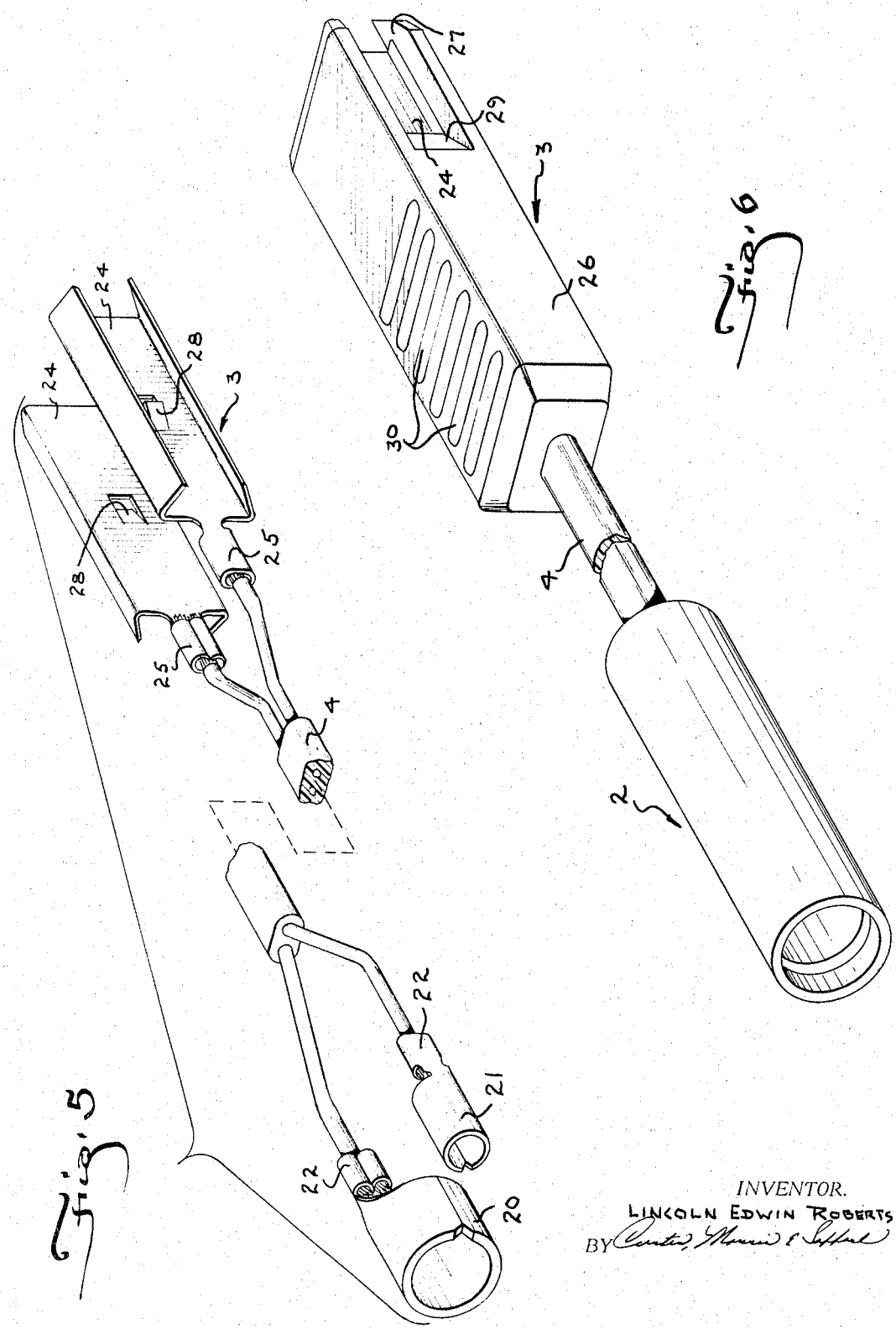

United States Patent Office 3,356,980
Patented Dec. 5, 1967

3,356,980
TEMPERATURE-SENSING DEVICE
Lincoln Edwin Roberts, Harrisburg, Pa., assignor to AMP Incorporated, Harrisburg, Pa.
Filed Jan. 5, 1965, Ser. No. 423,500
5 Claims. (Cl. 338—28)

ABSTRACT OF THE DISCLOSURE

A temperature sensing device for a clinical thermometer in which a pair of radially spaced conductors are supported in a dielectric body and are frictionally connected to a thermistor at one end and a plug at the other end. The frictional mounting eliminates the use of soldered joints to thereby increase the speed of response to temperature change, to provide uniform accuracy and high sensitivity. A cap frictionally mounted on the dielectric body and outer conductor supports a thermistor and a spring contact device frictionally mounted on the inner conductor is in frictional contact with the thermistor.

---

This invention relates to a temperature-sensing device and more particularly to a temperature-sensing device for use as a high-speed clinical thermometer.

The present day temperature-sensing devices for use in hospitals, clinics and doctor's offices employ a mercury tube thermometer. This type of thermometer has a number of salient disadvantages among which are the following: slow to give a reading, difficult to read, subject to breakage and incapable of being sterilized in a short period of time. Attempts have been made to provide temperature-sensing devices of the thermistor variety; however, these have met with several shortcomings, such as, soldered connection on the thermistor necessitate stabilization of the thermistor, contact metal on each side of the thermistor has excessive mass thereby decreasing response time of the thermistor and the amount of insulating material adjacent the thermistor has also excessive mass which decreases the response time of the thermistor.

It is, therefore, an object of the present invention to provide a temperature-sensing device having a high speed of response.

Another object of the present invention is to provide a temperature-sensing device which is capable of withstanding hard usage and rough handling.

A further object of the present invention is to provide a temperature-sensing device which is extremely sensitive, uniformly accurate and is adapted to be used in a variety of general temperature measurements.

An additional object of the present invention is to provide a temperature-sensing device which is not adversely affected by ambient temperature variations.

A still further object of the present invention is to provide a temperature-sensing device which is accurately matched electrically to an associated indicating device and which is removable therefrom.

Still an additional object of the present invention is to provide a temperature-sensing device and socket therefor which has no soldered connections.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration and principles thereof and the manner of applying them in practical use so that they may modify them in various forms, each as may be best suited to the conditions of a particular use.

In the drawings:

FIGURE 2 is a cross-sectional view of the temperature-sensing device, the plug thereof and the socket of the indicating means;

FIGURE 3 is a perspective exploded view of the components of the temperature-sensing device;

FIGURE 4 is a perspective view of the temperature-sensing device in its assembled condition;

FIGURE 5 is a perspective view of the components of the female and male plugs for connecting the temperature-sensing device to an indicating means;

FIGURE 6 is a perspective view showing the female and male plug of FIGURE 5 in their completed form.

Figure 1:
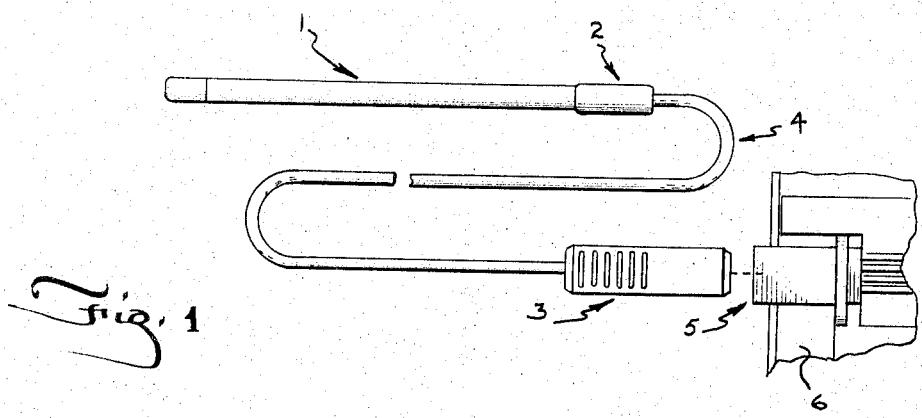
FIGURE 1 is a view showing the temperature-sensing device and the plug therefor exploded from its socket which is located in a fragmentarily illustrated indicating means.

As shown in FIGURE 1, a temperature-sensing device 1 has a female plug 2 connected thereto which, in turn, is connected to male plug 3 via insulated conductor means 4. Male plug 3 is insertable within female socket 5 which is mounted in a conventional indicating means 6 of the micro-ammeter or millivolt meter type.

Temperature-sensing device 1 comprises a unitary body member 7, a center spring contact member 8, a tubular insulation member 9, a sensing element 10 and a cup-shaped cap member 11.

Body member 7 comprises a center conductor member 12 and an outer conductor member 13 which are disposer in spaced and insulated relationship in housing member 14. Body member 7 is made in accordance with conventional molding techniques with conductor members 12 and 13 spaced in proper relationship in the mold prior to the material of housing member 14 being introduced into the mold. As can be discerned, each end of conductor member 12 extends outwardly from the corresponding end of housing member 14 and is preferably made of nickel. Each end of conductor member 13 is ring-shaped, and no portion of housing member 14 covers the exterior surface of these ring-shaped ends except for the one to the right in FIGURE 2 which has a small portion entirely covered by housing member 14. The ends of conductor member 13 are interconnected by an arcuate piece 15 which includes spaced ring sections 16. Arcuate piece 15 and its ring sections 16 are entirely enclosed within housing member 14. Conductor member 13 is preferably made of nickel-plated brass. The material of housing member 14 is preferably polypropylene.

Since there is so little distance between the center and outer conductor members, the inner conductor member may be coated along the area to be contained within housing member 14 with a thin layer of insulation material prior to the molding operation in order to insure the fact that the center conductor member is properly insulated from the outer conductor member; however, the outer conductor could be coated in like manner along its interior surface. Also, a tubular member of insulating material may be placed on center conductor 12 which terminates inwardly from the ends thereof so as to be enclosed within housing 14.

Contact member 8 includes a triangular-shaped ferrule member 17 which is insertable onto an end of center conductor member 12 for mechanical and electrical engagement therewith. One side of ferrule member 17 has an extension extending outwardly from a leading edge thereof and is bent at right angles with respect to the axis of ferrule member 17 to define a stop member 18 to limit the movement of the end of center conductor member 12 into ferrule member 17, as illustrated in FIGURE 2. A spring contact element 19 extends outwardly from the base of ferrule member 17. The free end of contact element 19 is bent away from its angular disposition to define a smooth contact surface. Tubular insulation member 9 comprises a thin piece of paper, cardboard, or the like, and provides thermal insulation for sensing element 10 to substantially diminish the effect of ambient conditions.

Sensing element 10, which is preferably a thermistor member, has a square or rectangular configuration. Thermistor members of this type are available on the market and comprise a ceramic type material having a substantial negative temperature coefficient of resistance and poor thermoconductivity characteristics. The two parallel faces of the thermistor members serve as electrical terminals and are preferably plated with a thin metallic film of a good conductive metal which is preferably silver. Cap member 11 is preferably made of nickel in accordance with draw-forming techniques.

In assembly, contact member 8 is mounted on the end of center conductor member 12 until it is bottomed against stop member 18, sensing element 10 is placed within cap member 11 in addition to tubular insulation member 9, then cap member 11 with members 8 and 9 disposed therein, is inserted onto body member 7 with cap member 11 electrically engaging the ring-shaped end of outer conductor member 13, thereby forming the temperature-sensing device. As illustrated in FIGURE 2, cap member 11 snugly engages part of housing member 14 so that cap member 11 is frictionally maintained in position thereon in order to insure that spring contact element 19 maintains sensing element 10 into constant engagement with the interior surface of the bottom of cap member 11. Thus, spring contact element 19 of center spring contact member 8 and center conductor member 12 define one terminal of the temperature-sensing device while cap member 11 and outer conductor member 13 define the other terminal of the temperature-sensing device.

The thermistor is placed into the cap member for electrical engagement with the conductor members of the housing member after housing member 14 and conductor members 12 and 13 thereof have been molded to form unitary body member 7 so that no molding operation is performed on the part containing the thermistor and no material is brought into engagement with the thermistor during the molding operation which might damage or effect the sensitivity of the thermistor.

Female plug 2 comprises an outer ferrule member 20 and an inner ferrule member 21. Each of these ferrule members includes a crimping section 22 which is crimped onto respective conductor members of conductor means 4. After ferrule members 20 and 21 have been crimped onto the conductor members of conductor means 4, they are encased in coaxial relationship in a suitable dielectric medium 23, such as, for example, polyvinylchloride, in accordance with conventional molding techniques. Thus, as illustrated in FIGURE 2, ferrule members 20 and 21 of female plug 2 electrically engage corresponding conductor members 12 and 13 of temperature-sensing unit 1 so that the temperature-sensing device can be removed from the female plug.

Male plug 3 comprises channel-shaped contact members 24 having crimping sections 25 which are crimped onto corresponding conductor members of conductor means 4, as illustrated in FIGURE 5. The bottoms of contact members 24 are disposed in opposed parallel relationship and are held together in this position by means of the suitable dielectric medium 26, such as, for example, polyvinylchloride. Dielectric medium 26 is molded onto contact members 24 and the insulation of conductor means 4 in accordance with conventional molding techniques. Dielectric medium 26 is provided with channels 27 in the side surface thereof, as illustrated in FIGURE 6, so as to expose part of contact members 24. Since channels 27 begin at the outer end of dielectric medium 26, the outer end of male plug 3 has an H-shaped configuration. Each contact member 24 has a tongue 28 struck outwardly therefrom into the channel formed by the contact member, and tongue 28 extends almost to inner inclined surface 29 of channels 27, as illustrated in FIGURE 2. Inclined surfaces 29 serve as stopping means in order to limit the inner movement of male plug 3 within female socket 5, as illustrated in FIGURE 2, and tongues 28 serve to reinforce inclined surfaces 29 as stop members.

Ribs 30 are disposed on the top and bottom surfaces of dielectric medium 26 rearwardly of channels 27 and these aid in gripping the male plug when it is to be inserted into female socket 5 or removed therefrom. Dielectric mediums 23 and 26 and the insulation of conductor means 4 is preferably of the same material, such as, for example, polyvinylchloride, so that when female plug 2 and male plug 3 are molded onto their respective ferrule and contact members and the insulation of conductor means 4, the dielectric medium of female plug 2 and male plug 3 will be bonded to the insulation of conductor means 4.

Figure 7:
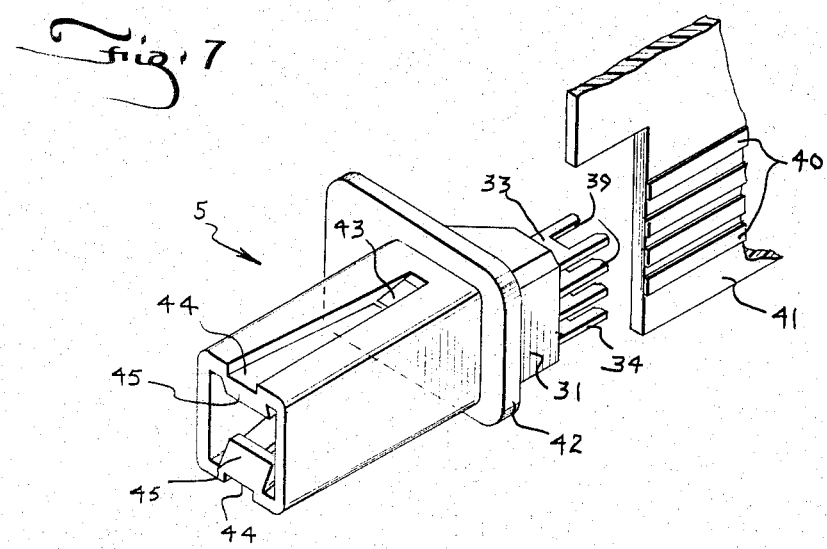
FIGURE 7 is an exploded perspective view of the socket in the indicating means and a printed circuit thereof.

Female socket 5, as illustrated in FIGURES 2 and 7, comprises two parts, a contact-carrying part 31 and a cover part 32. Both of these parts are molded from a suitable dielectric material in accordance with conventional molding techniques. Contact-carrying part 31 comprises outer contacts 33 and 34 and inner contacts 35 and 36 secured within part 31 during the molding thereof; however, these contacts could be removably mounted within passageways disposed in part 31.

Outer contacts 33 and 34 include respectively spring contact sections 37 and 38 with spring contact section 37 normally engaging inner contact 35 and spring contact section 38 normally disposed out of engagement with inner contact 36. Each of contacts 33–36 comprise a fork-engaging section 39 which electrically engages conductive elements 40 of a printed circuit board 41 disposed in indicating means 6. A flange 42 extends outwardly from contact-carrying part 31 and this serves to affix female socket within indicating means 6. Plugs 43 extend outwardly from the sides of part 31 forward of flange 42.

Cover part 32 is a hollow rectangular-shaped member having channels 44 disposed in the top and bottom surfaces and the entrance to cover part 32 has an H-shaped configuration, as illustrated in FIGURE 7, in order to accommodate the forward H-shaped configuration of male plug 3. Inwardly-inclined surfaces 45, disposed below channels 44, serve as stopping surface when inner inclined surfaces 29 of male plug 3 engage surfaces 45, as illustrated in FIGURE 2.

Slots 46 are located at the inner ends of channels 44 so that lugs 43 extend therethrough in order to lock cover part 32 onto contact-carrying part 31, so as to protect contacts 33–36 and to provide a semi-polarized entrance for male plug 3 since male plug 3 can be inserted into female socket 5 in two directions so long as channels 27 are in alignment with inwardly-inclined surfaces 45. Cover part 32 also provides support for contacts 33 and 34 which prevents these contacts from being over-extended as well as providing bias thereto. The forward surface of lugs 43 is inclined so as to facilitate the insertion of cover part 32 onto contact-carrying part 31 until lugs 43 are disposed in slots 46. Thus, a female socket 5 doubles as a contact-carrying member as well as a switch member with contacts 33 and 35 in normal engagement and contacts 34 and 36 normally out of engagement and when male plug 3 is inserted into female socket 5, as illustrated in FIGURE 2, contacts 33 and 35 are out of engagement and contacts 34 and 36 are brought into engagement. This means that when male plug 3 is not disposed in female socket 5, indicating means 6 is not in an operative condition, thereby conserving the life of the indicating means, and, as soon as male plug 3 is disposed within female socket 5, indicating means 6 is in a condition to give an indication upon the temperature-sensing device being brought into engagement with the thing of which a temperature indication is to be obtained.

Contact member 8, conductor member 13, contact members 24 and contacts 33–36 are susceptible to mass production by automatic machinery and are conveniently formed by shaping a sheet metal blank or strip in successive forming steps. The metal is sufficiently hard and resilient to impart to the connection area a spring-like character, yet in the case of ferrule members 20 and 21 and contact members 24, these are sufficiently malleable to permit cold-forging or crimping of the conductor-receiving area onto a conductor to provide an excellent electrical and mechanical connection.

The present invention is presently used as a clinical thermometer; it can easily be sterilized, it can be used interiorly or exteriorly of the body, it may be used to monitor a patient's temperature and it has a fast response time. While female plug 2 has been disclosed as a separate unit, it is possible to make temperature-sensing device 1 and female plug 2 as a unitary structure with conductor members 12 and 13 connected to corresponding conductor members of conductor means 4. While the present invention has been disclosed as utilizable as a clinical thermometer, it is obvious that the present invention can be used in conjunction with other environments wherein a temperature indication is to be ascertained.

As can be discerned, there has been disclosed a unique temperature-sensing device and a socket member to electrically connect the temperature-sensing device with an indicating means.

It will, therefore, be appreciated that the aforementioned and other desirable objects have been achieved; however, it should be emphasized that the particular embodiments of the invention, which are shown and described herein, are intended as merely illustrative and not as restrictive of the invention.

What is claimed is:

1. A temperature-sensing device comprising a dielectric body member, an inner conductor in said body and having an exposed portion, an outer conductor radially spaced by the dielectric from the inner conductor and having an exposed portion, a replaceable conductive cap member mounted in frictional engagement with the body member and the exposed portion of the outer conductor and having a surface space from the end of the body, contact means frictionally mounted in contact with the exposed portion of the inner conductor, spring means integral with the contact means, and a sensing element having a substantial temperature coefficient of resistance mounted in said cap between said surface and spring means and urged into electrical contact with the said surface means by the biasing force of the spring means.

2. A device as defined in claim 1 further including insulation means within said cap around said sensing element.

3. A device as defined in claim 1 wherein the sensing element is a thermistor.

4. A device as defined in claim 1 wherein the contact and spring means comprises a triangular frame of planar sheets frictionally gripping the inner conductor, a short extension bent from one of the sheets in engagement with the end of the inner conductor, and a long extension of another sheet being bent to form a spring.

5. A device as defined in claim 1 wherein each of said conductors extends outwardly from the other end of said body member, and plug means having inner and outer conductive means in electrical engagement with the respective inner and outer conductors.

References Cited

UNITED STATES PATENTS

| | | | |
|---|---|---|---|
| 2,484,585 | 10/1949 | Quinn | 338—25 |
| 2,526,251 | 10/1950 | Medlar | 338—30 |
| 2,753,714 | 7/1956 | Perkins et al. | 338—23 X |
| 2,818,482 | 12/1957 | Bennett | 338—30 |
| 2,925,572 | 2/1960 | Boddy | 338—28 |
| 2,933,708 | 4/1960 | Elliot et al. | 338—28 |
| 2,961,625 | 11/1960 | Sion | 338—28 |
| 2,988,717 | 6/1961 | Bergsma | 338—28 |
| 3,044,296 | 7/1962 | Boddy | 338—28 |
| 3,175,178 | 3/1965 | Boddy | 338—28 |

FOREIGN PATENTS 1,046,011  10/1955  France.

RICHARD M. WOOD, *Primary Examiner.*

W. D. BROOKS, *Assistant Examiner.*